(12) United States Patent
Inagaki

(10) Patent No.: US 12,546,420 B2
(45) Date of Patent: Feb. 10, 2026

(54) HOSE JOINT

(71) Applicant: TOYOX CO., LTD., Toyama (JP)

(72) Inventor: Akihiro Inagaki, Toyama (JP)

(73) Assignee: TOYOX CO., LTD., Toyama (JP)

( * ) Notice: Subject to any disclaimer, the term of this patent is extended or adjusted under 35 U.S.C. 154(b) by 0 days.

(21) Appl. No.: 18/842,873

(22) PCT Filed: Mar. 1, 2023

(86) PCT No.: PCT/JP2023/007450
§ 371 (c)(1),
(2) Date: Aug. 30, 2024

(87) PCT Pub. No.: WO2023/176440
PCT Pub. Date: Sep. 21, 2023

(65) Prior Publication Data
US 2025/0198554 A1  Jun. 19, 2025

(30) Foreign Application Priority Data
Mar. 14, 2022  (JP) ................. 2022-039319

(51) Int. Cl.
*F16L 33/22* (2006.01)
*F16L 19/065* (2006.01)
*F16L 33/24* (2006.01)

(52) U.S. Cl.
CPC .......... *F16L 33/223* (2013.01); *F16L 19/065* (2013.01); *F16L 33/24* (2013.01)

(58) Field of Classification Search
CPC ....... F16L 33/223; F16L 19/065; F16L 19/08; F16L 19/05; F16L 19/06; F16L 33/226; F16L 33/24; F16L 33/224
See application file for complete search history.

(56) References Cited

U.S. PATENT DOCUMENTS

| | | | | |
|---|---|---|---|---|
| 3,118,691 | A * | 1/1964 | Press | F16L 33/223 |
| 4,169,967 | A * | 10/1979 | Bachle | F16L 33/224 |
| 8,497,776 | B2 * | 7/2013 | Stern | |
| 2004/0100097 | A1 * | 5/2004 | Fukano | |

(Continued)

FOREIGN PATENT DOCUMENTS

| | | |
|---|---|---|
| JP | 4-068290 | 6/1992 |
| JP | 2007-024302 | 2/2007 |

(Continued)

OTHER PUBLICATIONS

International Search Report issued in Corresponding International Patent Application No. PCT/JP2023/007450, dated May 23, 2023, along with an English translation thereof.

(Continued)

*Primary Examiner* — William S. Choi
(74) *Attorney, Agent, or Firm* — Greenblum & Bernstein, P.L.C.

(57) ABSTRACT

A hose joint including a nipple body and a cap nut. The cap nut has a cylindrical barrel part and a nut part, the nut part has a width-across-flats part, and a circumscribed circle of an outer periphery of the width-across-flats part has a diameter larger than a diameter of the cylindrical barrel part, and an inscribed circle of the outer periphery of the width-across-flats part has a diameter smaller than the diameter of the cylindrical barrel part.

5 Claims, 12 Drawing Sheets

(56) References Cited

U.S. PATENT DOCUMENTS

| | | | | |
|---|---|---|---|---|
| 2008/0272590 A1* | 11/2008 | Howard | ............... | F16L 33/224 |
| 2009/0224536 A1* | 9/2009 | Fukushima | ........... | F16L 33/224 |
| 2013/0307265 A1 | 11/2013 | Sekino | | |
| 2015/0102597 A1* | 4/2015 | Wood | | |
| 2016/0116093 A1* | 4/2016 | Filipczak | .............. | F16L 33/223 |
| 2020/0049289 A1* | 2/2020 | Levy | .................... | F16L 33/223 |

FOREIGN PATENT DOCUMENTS

| | | |
|---|---|---|
| JP | 2009-115154 | 5/2009 |
| JP | 2012-163132 | 8/2012 |
| JP | 2013-036503 | 2/2013 |
| JP | 2017-145868 | 8/2017 |

OTHER PUBLICATIONS

Decision to Grant issued in Corresponding JP Patent Application No. 2022-039319, dated Aug. 8, 2023, along with an English translation thereof.

Written Opinion Issued in Corresponding International Patent Application No. PCT/JP2023/007450, dated May 23, 2023, along with an English translation thereof.

* cited by examiner (a)

(b)

(c)      (d)

(a)

(b)

(a)

(b)

(a)

(b)

(c)　　　　　　　(d)

(a)

(b)

(c)　　　　　(d)

HOSE JOINT

TECHNICAL FIELD

The present invention relates to a hose joint that is used for connecting a deformable hose body, e.g., a hose or tube, having flexibility and formed of a soft material such as synthetic resin or rubber.

BACKGROUND ART

There is a conventional example of such a hose joint including: a nipple body that has a cylindrical guide part to be fitted into a hose body; a diameter expanding/contracting sleeve that is concentrically fitted onto the guide part of the nipple body, with a space therebetween allowing the hose body to be inserted, and that has a diameter-contractable part facing the guide part; and a cap nut that is fitted onto the diameter expanding/contracting sleeve so as to contract the diameter-contractable part of the diameter expanding/contracting sleeve, and deforms the hose body fitted inside the diameter expanding/contracting sleeve (see PTL 1, for example).

CITATION LIST

Patent Literature

[PTL 1] Japanese Patent Application Laid-open No. 2013-036503

There are some other conventional hose joints with improved workability. FIG. 9 is a schematic view illustrating such a conventional hose joint, in which (a) is a front view, (b) is a left perspective view, and (c) is a right perspective view. FIG. 10 is a schematic view illustrating the cap nut only, in which (a) is a front view, (b) is a left perspective view, and (c) is a right perspective view. As illustrated in FIGS. 9 and 10, a nipple body 5 has a nipple body width-across-flats part 51 (hexagonal width-across-flats part) at the center. The left and right ends of the nipple body 5 have a connection part 54 to be connected to a tube connection port of another equipment (not illustrated) and a guide part 53 to be fitted into the hose body, respectively. A cap nut 6 includes: a cylindrical barrel part 61 having a female thread part on the inner peripheral surface, so as to enable the cap nut 6 to be meshed with a male thread part (not illustrated) provided to the nipple body 5; and a nut part 62. The nut part 62 is formed in a hexagonal nut shape so that a tightening tool such as a spanner or a wrench can become engaged therewith. With a hose body (not illustrated) inserted into the space between a diameter contractable part (not illustrated) of the diameter expanding/contracting sleeve (not illustrated) and the guide part 53 of the nipple body 5, a tightening tool such as a spanner is engaged on the nipple body width-across-flats part 51, and another tightening tool is engaged on the nut part 62. The tightening tools are then rotated reversely with respect to each other so that the hose body is tightened.

In such a conventional hose joint, the dimension of the outer periphery of the nut part 62 is set within the dimension of the cylindrical barrel part 61 so as to ensure that a step D is formed between the width-across-flats part and the outer surface of the cylindrical barrel part. This step D serves to, by enabling the tool to be positioned perpendicularly to the joint, impart a maximum torque to the tool and to improve the workability. With this, when a task involving engaging and disengaging a tool such as a wrench onto and from the width-across-flats part is performed, it becomes possible to engage the tool such as a wrench on the width-across-flats part reliably, so that the hose joint can be tightened quickly and continuously without any loss. FIG. 11 is a schematic view for explaining such a task, and it may be understood how the tool can be readily positioned.

SUMMARY OF INVENTION

Technical Problem to be Solved

Pipe members such as hot water pipes or feed water pipes sometimes require installation in a confined space, or need to be laid in parallel piping at a narrow interval, depending on how the pipe members are used or the environment where the pipe members are to be used. In such a case, a sufficient space for handling a tool may be unavailable, and, in some situations, it may be demanded to engage the tool onto the nut part with an angle. However, the step D may be in the way when an attempt is made to engage the tool with an angle, preventing the hexagonal nut from being held with a tool, such as a wrench, in a manner enabling a sufficient torque to be exerted thereto. FIG. 12 illustrates such a situation.

Such an angled engagement of a tool will become possible by making the outer shape of the hexagonal nut larger, but an increased outer shape will be disadvantageous when there is a sufficient space available, because without the step D, some of the perpendicular load will be lost and the workability will be sacrificed.

The present invention is aimed to address such a problem, and an object of the present invention is to provide a hose joint that is easy to use, without sacrificing the workability.

Means for Solving the Problem

In order to achieve such an object, the present invention provides a hose joint including a nipple body and a cap nut, in which: the cap nut has a cylindrical barrel part and a nut part; the nut part has at least one width-across-flats part; a circumscribed circle of an outer periphery of the width-across-flats part has a diameter larger than the diameter of the cylindrical barrel part; and an inscribed circle of the outer periphery of the width-across-flats part has a diameter smaller than the diameter of the cylindrical barrel part.

Advantageous Effects of Invention

According to the present invention characterized as described above, it is possible to provide a hose joint that is easy to use, without sacrificing the workability.

DESCRIPTION OF EMBODIMENTS

An embodiment of the present invention will now be explained in detail with reference to drawings. The drawings shown below are prepared for the illustrative purpose, and members that are unnecessary in the description are sometimes intentionally omitted, for the ease of understanding. Furthermore, members are sometimes illustrated in a larger or smaller scale also for the illustrative purpose, and the drawings are not in the exact scale. In the description hereunder, parts having the same functions are assigned with the same reference signs in different drawings, and redundant explanations in the descriptions of the drawings are omitted as appropriate.

(Overall Structure of Hose Joint)

Figure 1:
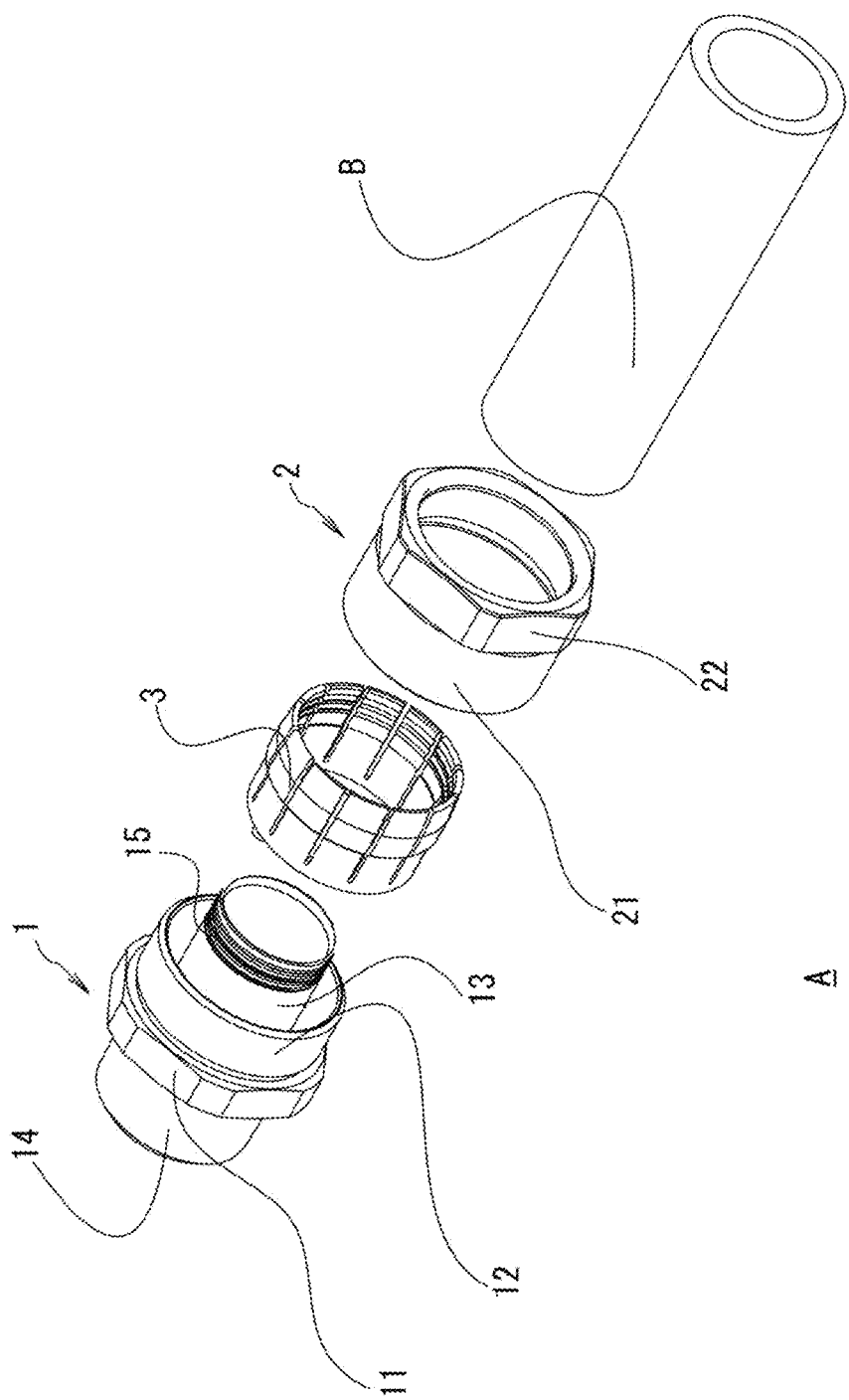
FIG. 1 is an exploded perspective view of the entire hose joint according to an embodiment of the present invention.
Figure 2:
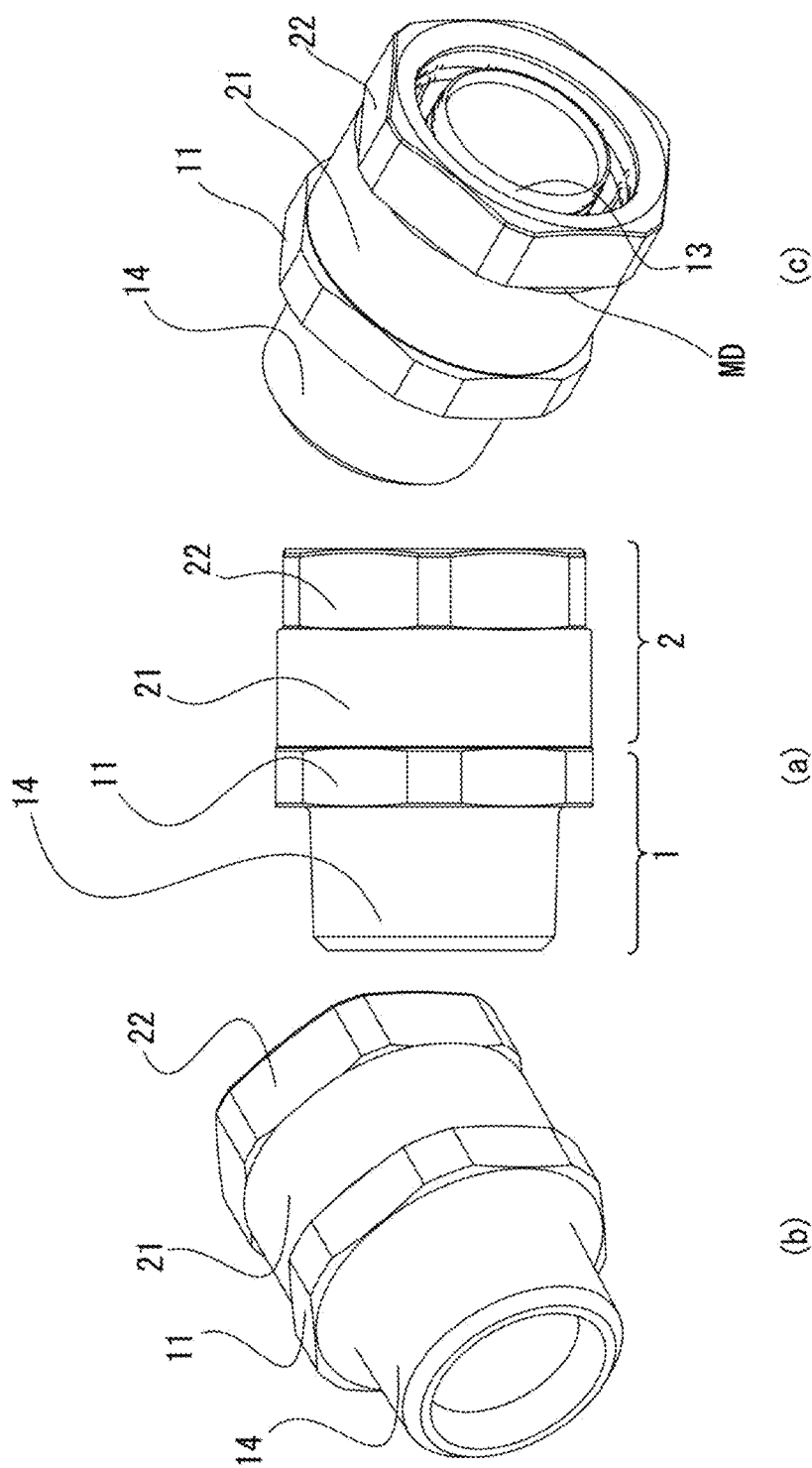
FIG. 2 is a schematic view of the hose joint according to the embodiment of the present invention, in which (a) is a front view, (b) is a left perspective view, and (c) is a right perspective view.
Figure 3:
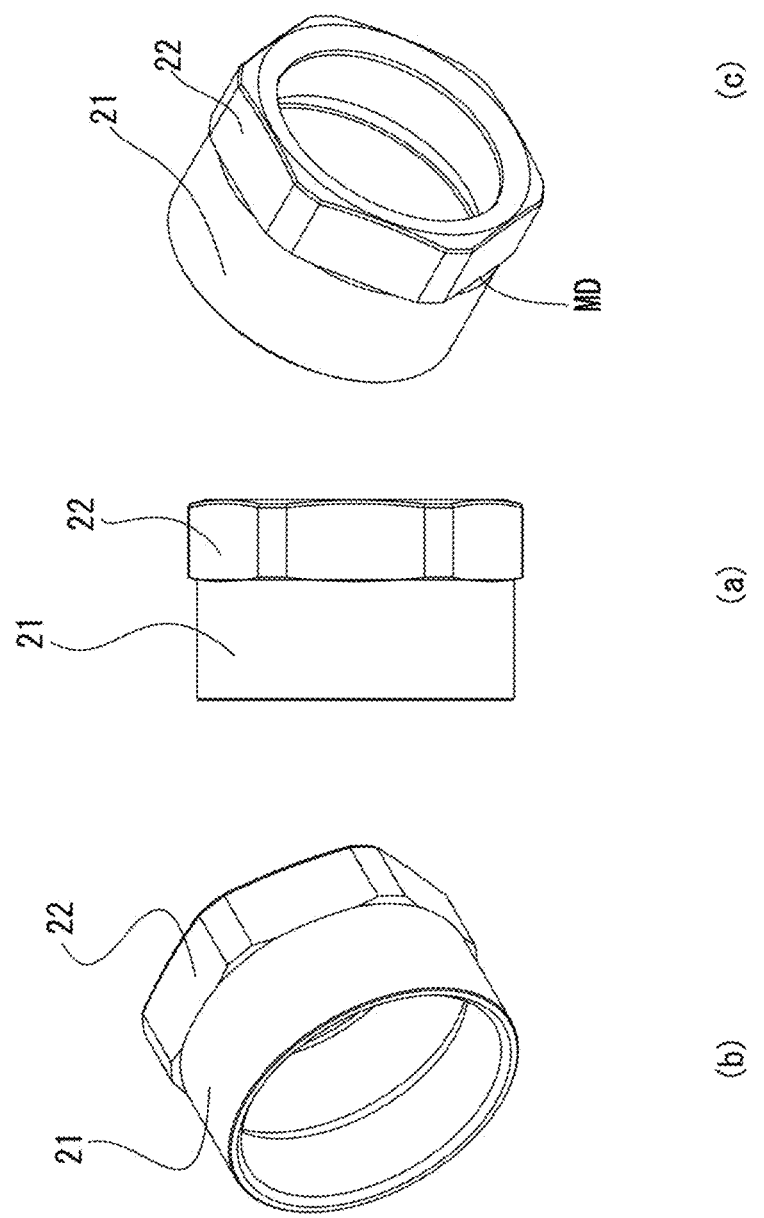
FIG. 3 is a schematic view illustrating the cap nut only of the hose joint according to the embodiment of the present invention, in which (a) is a front view, (b) is a left perspective view, and (c) is a right perspective view.

The overall structure of a hose joint A according to an embodiment of the present invention will now be explained. FIG. 1 an exploded perspective view of the entire hose joint A according to the embodiment of the present invention. FIG. 2 is a schematic view of the hose joint A according to the embodiment of the present invention, in which (a) is a front view, (b) is a left perspective view, and (c) is a right perspective view. FIG. 3 is a schematic view illustrating only the cap nut included in the hose joint A according to the embodiment of the present invention, in which (a) is a front view, (b) is a left perspective view, and (c) is a right perspective view.

The hose joint A according to the embodiment of the present invention includes, as illustrated in FIGS. 1 to 3, a nipple body 1 and a cap nut 2. More specifically, the nipple body 1 includes: a connection part 14 to be connected to a tube connection port of another equipment (not illustrated); a guide part 13 provided along an insertion space of a hose body B having flexibility; a cylindrical part 12 provided in a manner radially facing the outer peripheral surface of the guide part 13, with the insertion space of the hose body B therebetween; and a nipple body width-across-flats part 11. The cap nut 2 includes: a cylindrical barrel part 21 provided in a manner radially facing the outer peripheral surface of the guide part 13, with the insertion space of the hose body B therebetween, and reciprocatingly along the axial direction of the guide part 13; and a nut part 22. In addition, in the embodiment of the present invention, a diameter expanding/contracting sleeve 3 is provided in a manner radially facing the outer peripheral surface of the guide part 13, reciprocatingly along the axial direction of the guide part 13, and elastically deformably in the radial direction.

The nipple body 1 and the guide part 13 have cylindrical shapes formed of a hard material such as metal, e.g., brass, or a hard synthetic resin, and having an outer diameter substantially equal to an inner diameter of the hose body B, which is to be described later, or slightly larger or slightly smaller than the inner diameter of the hose body B, or having thin thickness of cylindrical shapes formed by machining a rod member, a pipe member, or a casting of a deformable stiff material such as stainless steel, and having an outer diameter substantially equal to, or slightly larger or slightly smaller than the inner diameter of the hose body B.

Preferably, an uneven part 15 for preventing disengagement is further formed on the outer peripheral surface of the guide part 13. The uneven part 15 faces the inner surface of hose body B.

In the example illustrated, as the uneven part 15 for preventing disengagement, annular concave and convex parts are formed alternately and successively, as in a bamboo shoot shape, on the outer peripheral surface of the guide part 13 near its axial end. As another example not illustrated, the guide part 13 may have a smooth outer peripheral surface formed thereon.

The cylindrical part 12 is formed to have a cylindrical shape having an inner diameter larger than the outer diameter of the hose body B which is to be described later, and is disposed immovably in the hose insertion direction by being integrally formed on the outside of the guide part 13, forming a double cylindrical therewith, or disposed immovably in the hose insertion direction by being formed separately from the guide part 13 and fitted onto the outside of the guide part 13, forming a double cylindrical therewith. A male thread, not illustrated, is engraved on the outer peripheral surface of the cylindrical part 12.

The cap nut 2 is formed of a rust-resistant metal material, such as brass or stainless steel, or other stiff material, and has a cylindrical barrel part 21 which is formed in a substantially cylindrical shape, with one part thereof in an axial direction having an inner diameter larger than the outer diameter of the diameter expanding/contracting sleeve 3 to be described later. A female thread is engraved on the inner peripheral surface of the cylindrical barrel part 21, and by screwing the female thread onto the male thread engraved on the outer peripheral surface of the cylindrical part 12, the cap nut 2 is supported with respect to the guide part 13 reciprocatingly in the hose insertion direction and the hose disengagement direction. Further, a nut part 22 for performing rotating operations is provided on the outer peripheral surface adjacent to the cylindrical barrel part 21 of the cap nut 2.

The diameter expanding/contracting sleeve 3 is formed in a substantially cylindrical shape, made of an elastically deformable material, such as polyacetal resin or another synthetic resin with a highly smooth surface and highly heat resistant. The diameter expanding/contracting sleeve 3 also radially faces the outer peripheral surface of the guide part 13, with the insertion space of the hose body B therebetween, and is disposed reciprocatingly in the hose insertion direction and the hose disengagement direction.

The diameter expanding/contracting sleeve 3 has an elastically deforming part that expands and contracts diameter elastically in the radial direction, and set an inner diameter being substantially equal to or larger than the outer diameter of the hose body B during diameter expansion as described later, and smaller than the outer diameter of the hose body B during diameter contraction.

As a specific example of the elastically deforming part, the elastically deforming part is structured to expand or contract diameter smoothly by stretchably deforming elastically in the radial direction, by forming cutouts such as slots, slits, or recesses in a part of the axial direction of the diameter expanding/contracting sleeve 3.

In the example illustrated, a plurality of cutouts of slots extending to the axial direction from one axial end of the diameter expanding/contracting sleeve 3 are arranged along the circumferential direction, so that the entire axial length of the diameter expanding/contracting sleeve 3 can expand and contract diameter smoothly.

Furthermore, as other examples not illustrated, it is also possible to form a plurality cutouts of slots (slits) extending linearly in the axial direction from both axial ends of the diameter expanding/contracting sleeve 3, in a staggered fashion along the circumferential direction, or to form slots extending non-linearly, e.g., curved slots.

Examples of the hose body B include a hose or a tube formed of a soft synthetic resin such as vinyl chloride, or of a soft material such as silicone rubber or another type of rubber, and the hose body B preferably has smooth inner and outer surfaces.

In a specific example of the hose body B illustrated, a hose having a single layer structure is used.

Furthermore, as other examples of the hose body B not illustrated, a hose body of many types, with different structures may also be used. Such examples include: a laminated hose (braid hose) in which one or more braids made of a synthetic resin (reinforcing threads) are embedded in a spiral shape as an intermediate layer between transparent or non-transparent outer and inner layers; a spiral reinforced hose (VOHRAN hose) in which, as a intermediate layer, a belt-like reinforcing member made of a synthetic resin or a metal with a rectangular cross section and a linear reinforcing member with a circular cross section, is wound in a spiral shape and integrated; or a spiral reinforced hose in which a metal wire or linear material made of a hard synthetic resin is embedded in a spiral shape.

(Structures of Main Parts for Improving Workability)

A structure contributing to improvements in the workability in tightening the hose joint A according to the embodiment of the present invention will now be explained.

In the cap nut 2, while both ends of plane surfaces of the width-across-flats part of the hexagonal nut of the nut part 22, where a tool such as a spanner comes into contact with, protrude from the cylindrical barrel part 21, as illustrated in FIG. 3(b), the cylindrical barrel part 21 protrudes from the center of the plane surfaces of the width-across-flats part of the hexagonal nut of the nut part 22 where a tool such as a spanner comes into contact with, as illustrated in FIG. 3(c). Therefore, crescent-shaped steps MD are formed between the width-across-flats part and the outer surface of cylindrical barrel part, as illustrated in FIG. 3(c).

Figure 4:
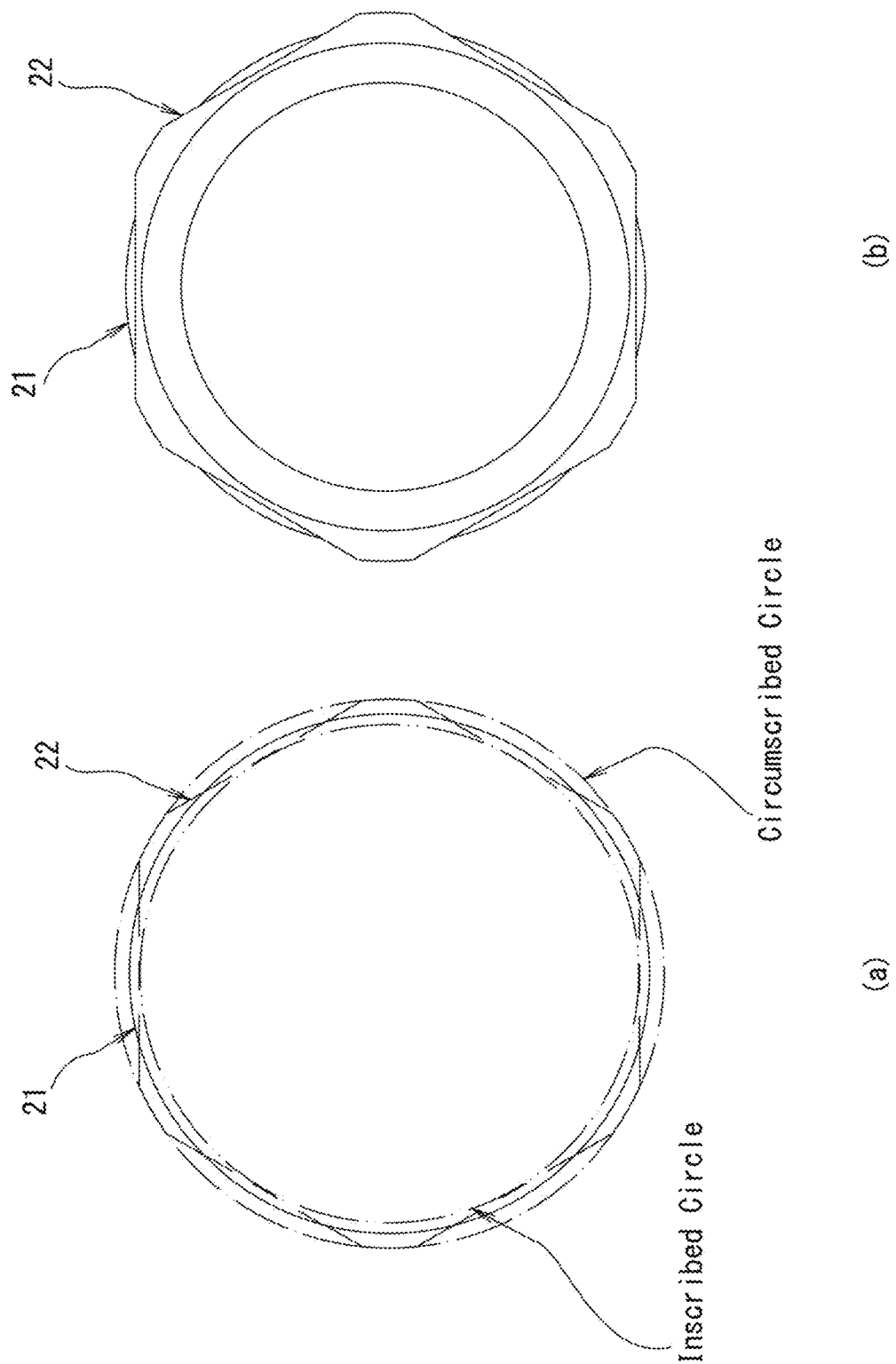
FIG. 4 is a schematic view for explaining a relationship among the dimensions of the hose joint according to the embodiment of the present invention, in which (a) is a schematic view corresponding to a left side view, and (b) is a schematic view corresponding to a right side view.

FIG. 4 is a schematic view for geometrically explaining a relationship in the dimensions of the hose joint A according to the embodiment of the present invention, in which (a) is a schematic view corresponding to a left side view of the cap nut 2 illustrated in FIG. 3, and (b) is a schematic view corresponding to a right side view of the cap nut 2 illustrated in FIG. 3. In other words, parts that are not necessary in explaining the dimensional relationship are not illustrated.

While a circumscribed circle of the outer periphery of the width-across-flats part of the nut part 22 (hexagonal nut) has a diameter larger than the diameter of the cylindrical barrel part 21, an inscribed circle of the outer periphery of the width-across-flats part of the nut part 22 (hexagonal nut) has a diameter smaller than the diameter of the cylindrical barrel part 21. Therefore, the configuration is realized that the cap nut 2 has crescent-shaped steps MD, and the width-across-flats part has portions that protrude outward from the cylindrical barrel part 21.

Figure 5:
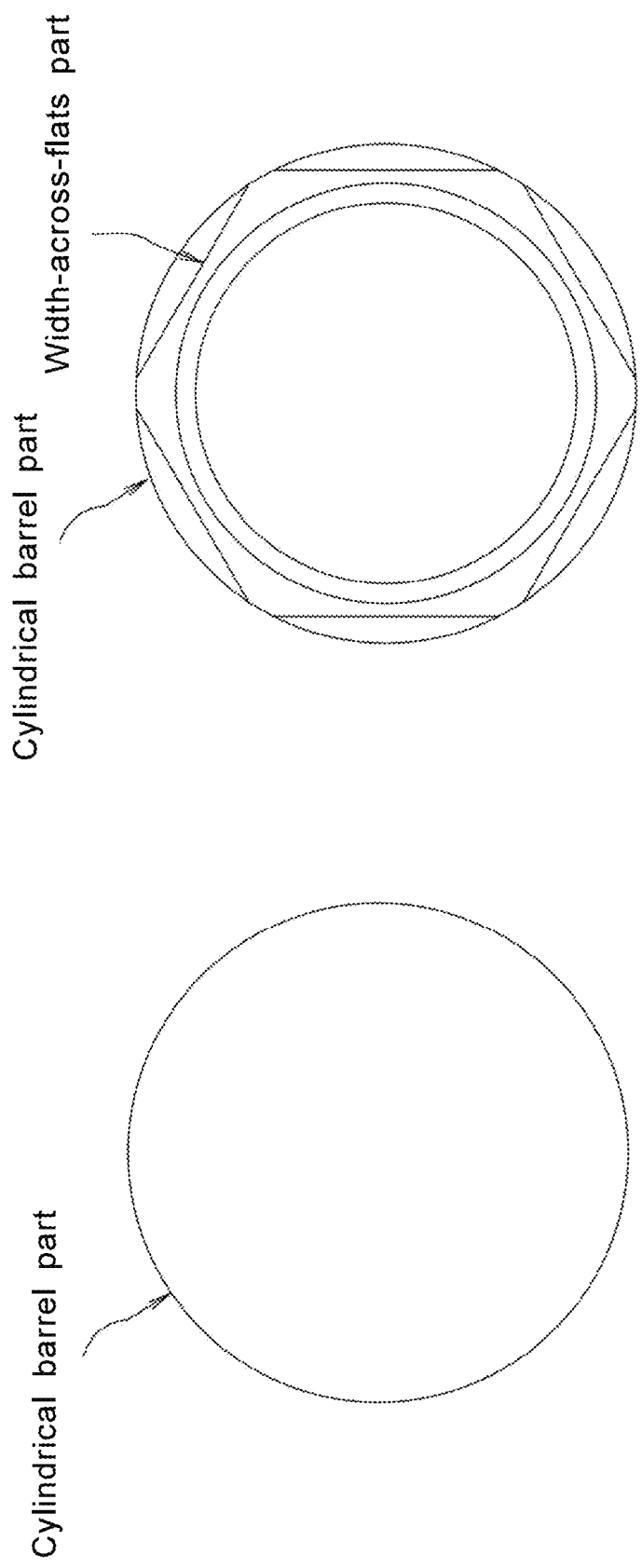
FIG. 5 is a schematic view for explaining a relationship among the dimensions of a conventional hose joint, in which (a) is a schematic view corresponding to a left side view, and (b) is a schematic view corresponding to a right side view.
Figure 10:
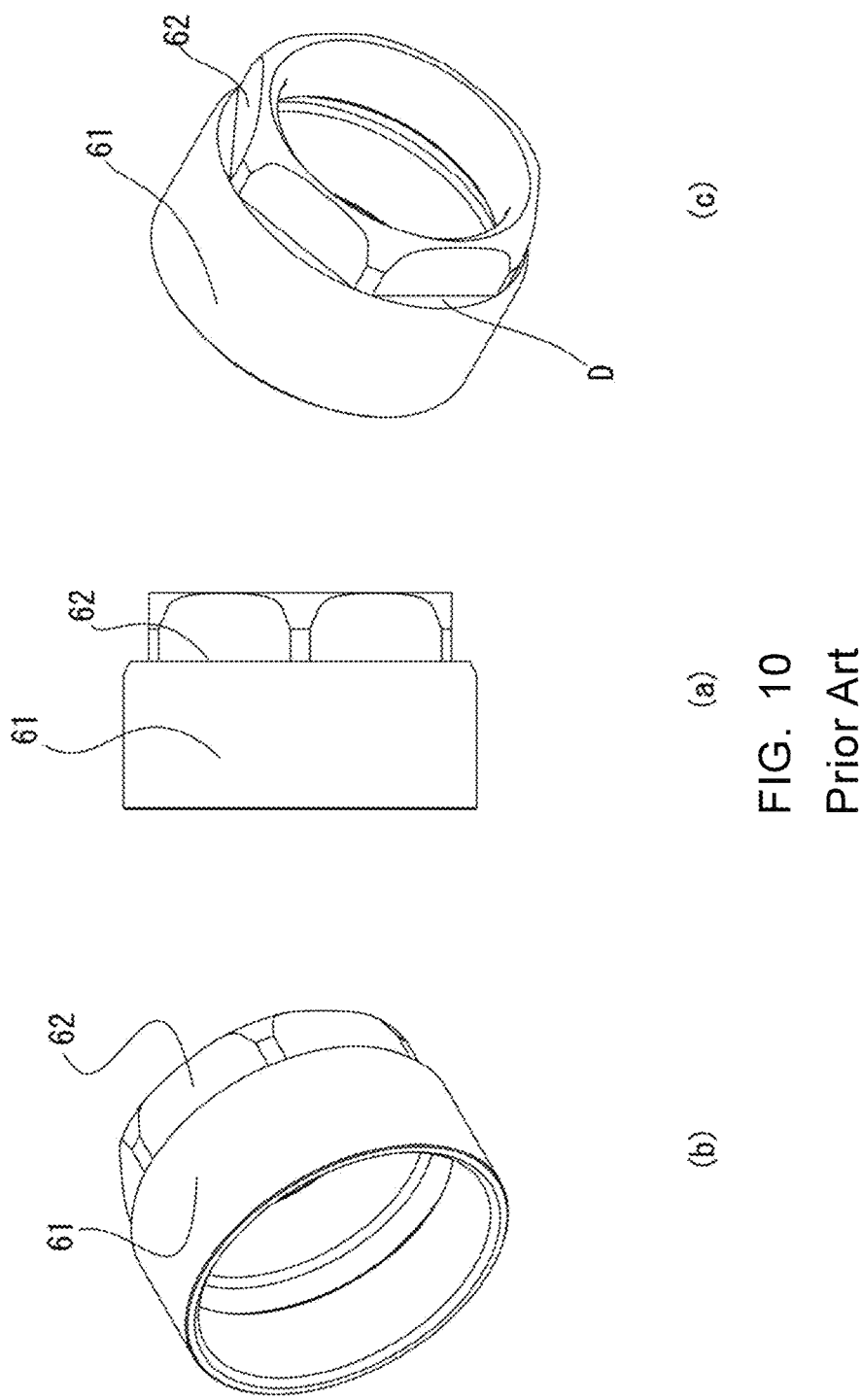
FIG. 10 is a schematic view illustrating only a cap nut included in the conventional hose joint, in which (a) is a front view, (b) is a left perspective view, and (c) is a right perspective view.
Figure 11:
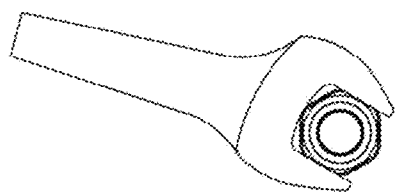
FIG. 11 is a schematic view for explaining a task in which a spanner is engaged onto the conventional hose joint at the right angle.
Figure 11:
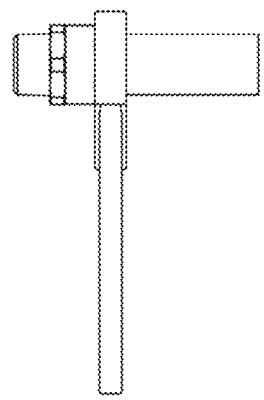
Figure 11:
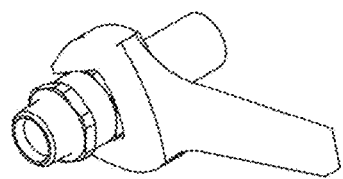
Figure 11:
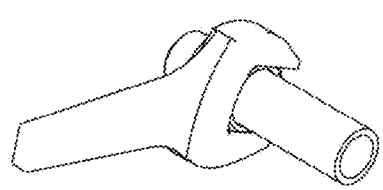
Figure 12:
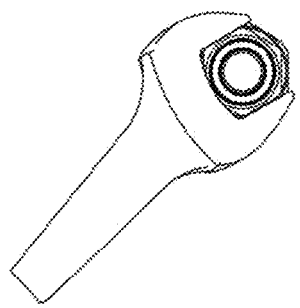
FIG. 12 is a schematic view for explaining difficulty of a task in which a spanner is engaged at an angle of approximately 30 degrees, onto the conventional hose joint.
Figure 12:
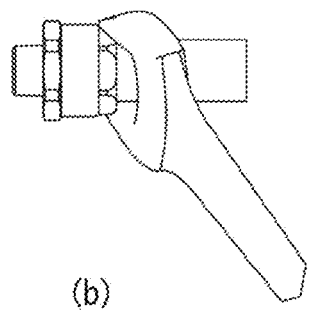
Figure 12:
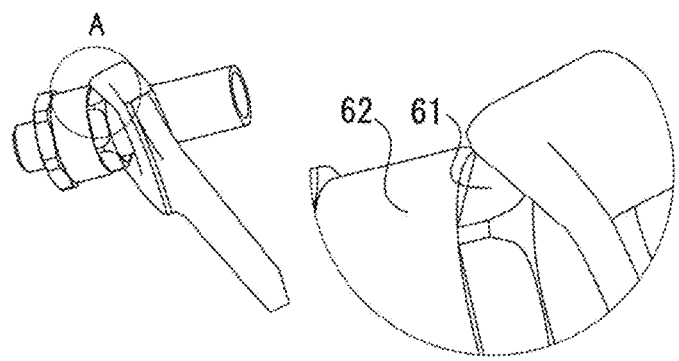

For reference, FIG. 5 is a schematic view for geometrically explaining a relationship in the dimensions in the conventional hose joint, in which (a) is a schematic view corresponding to a left side view of the cap nut 6 illustrated in FIG. 10, and (b) is a schematic view corresponding to a right side view of the cap nut 6 illustrated in FIG. 10. In other words, parts that are not necessary in explaining the dimensional relationship are not illustrated.

While the outer periphery of the cylindrical barrel part and the outer periphery of the nut part are both visible in FIG. 5(b), the outer periphery of the nut part is on the inner side of the outer periphery of the cylindrical barrel part so that the outer periphery of the nut part is not visible in FIG. 5(a).

Figure 6:
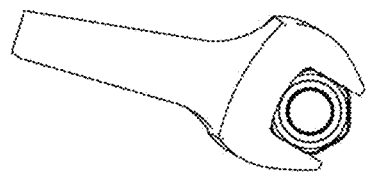
FIG. 6 is a schematic view for explaining a task in which a spanner is engaged onto the hose joint according to the embodiment of the present invention, at an angle of approximately 30 degrees.
Figure 6:
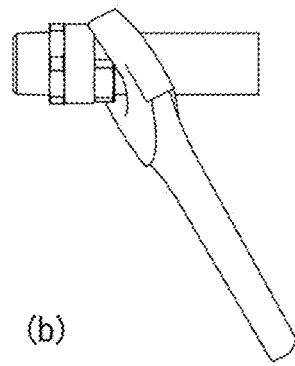
Figure 6:
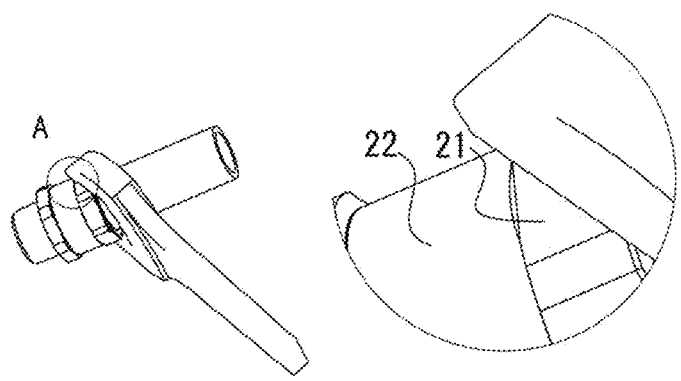
Figure 9:
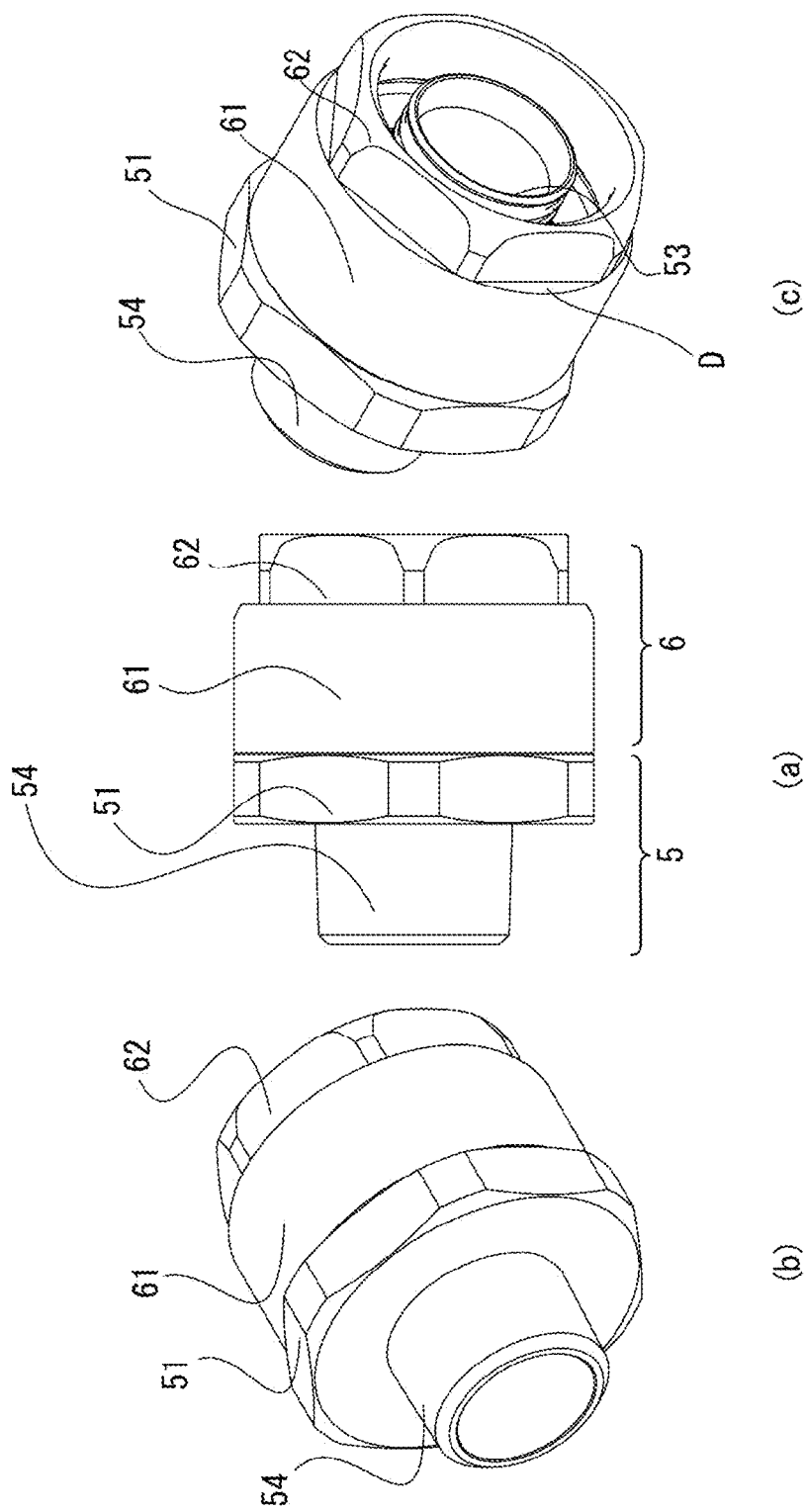
FIG. 9 is a schematic view illustrating the conventional hose joint, in which (a) is a front view, (b) is a left perspective view, and (c) is a right perspective view.

In the manner described above, it should be understood that the hose joint A according to the embodiment of the present invention has a characterizing dimensional relationship, with respect to the conventional hose joint. According to the embodiment of the present invention having such characteristics, when there is a sufficient space available in tightening the joint, the tool can be positioned with respect to the crescent-shaped steps MD in a direction perpendicular to the joint, so that the maximum torque can be exerted on the tool, in the same manner as for the conventional hose joint illustrated in FIG. 9. By contrast, when piping in a confined space or parallel piping at a narrow interval is necessary, a tool such as a wrench can be engaged at an angle onto the width-across-flats part protruding outward from the cylindrical barrel part 21, as illustrated in FIG. 6, so that sufficient torque can be exerted. Furthermore, the thickness of the width-across-flats part can be increased, compared with the conventional counterpart, so that it is possible to enhance the strength, and to prevent deformation or damages during the process of tightening with a spanner.

Each corner of the width-across-flats part (hexagonal nut) has a chamfered shape. However, it does not mean that this shape is achieved by actually chamfering a member of a regular hexagonal shape from the start, but it has the same shape as a chamfered member as a result. The cap nut 2 can be achieved by machining a material having the size of the chamfered part machining a rod member or pipe member that is circular or hexagonal. In this manner, machining can be started with a smaller material based on the size of the chamfered part; therefore, the material cost can be reduced.

(Dimensional Relationship Between Nipple Body and Cap Nut)

The description will now be continued by referring back to FIG. 2. In the hose joint A according to the embodiment of the present invention, the distance between two faces of the nipple body width-across-flats part 11 is set larger than the diameter of the cylindrical barrel part 21 of the cap nut 2, as generally visible in FIGS. 2(b) and 2(c). Because spanners have some backlash so as to be able to fit onto the width-across-flats part, if the distance between two faces of the width-across-flats part is equal to the diameter of the cylindrical barrel part, during tightening work, the cylindrical barrel part 21 of the cap nut 2 may interfere the spanner which keeps the nipple body 1 fixed, and the cylindrical barrel part 21 may become damaged. In the hose joint A according to the embodiment of the present invention, it is possible to suppress such an interference, and to prevent damages of the outer surface of the cap nut 2, effectively. However, even if the distance between two faces of the width-across-flats part and the diameter of the cylindrical barrel part are set equal to each other, it is not impossible to tighten the joint, and the joint can be fastened without interference as long as the spanner is carefully fixed. Therefore, it is not technically essential to set the width across the nipple body width-across-flats part 11 larger than the diameter of the cylindrical barrel part 21.

(Structure for Enhancing Resistance Against Disengagement of Hose Body)

A structure for improving the resistance against disengagement of the hose body with respect to the hose joint A according to the embodiment of the present invention will now be explained.

Figure 7:
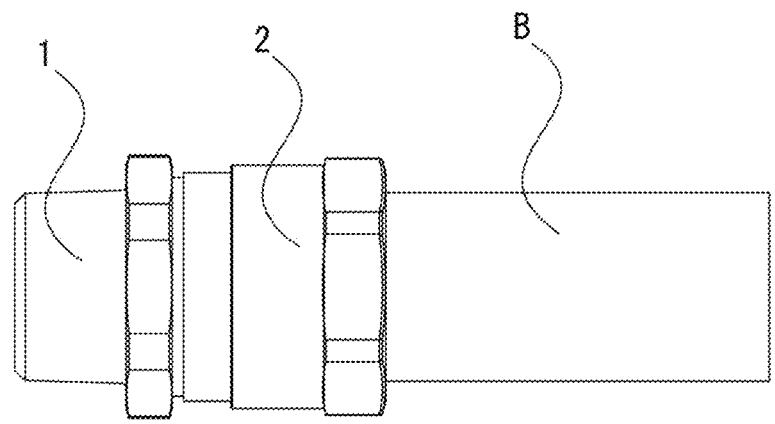
FIG. 7 is a schematic view illustrating a configuration before the hose joint according to the embodiment of the present invention is coupled, in which (a) is a front view, and (b) is a longitudinal cross sectional front view.
Figure 7:
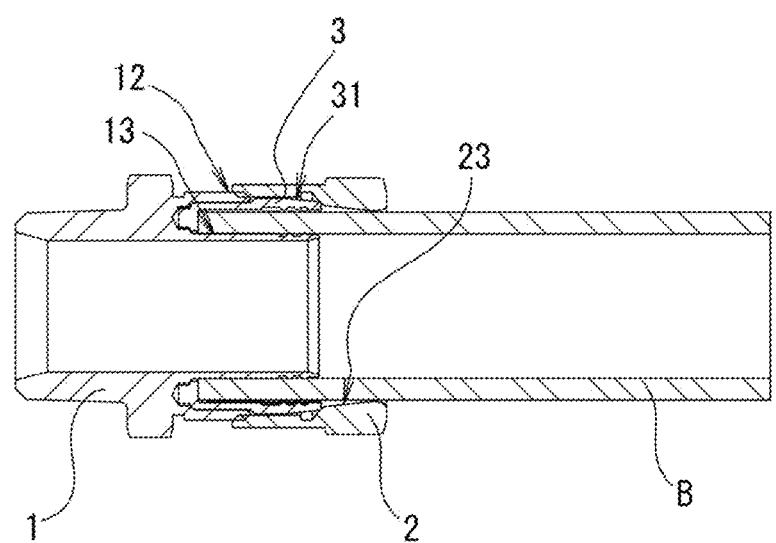
Figure 8:
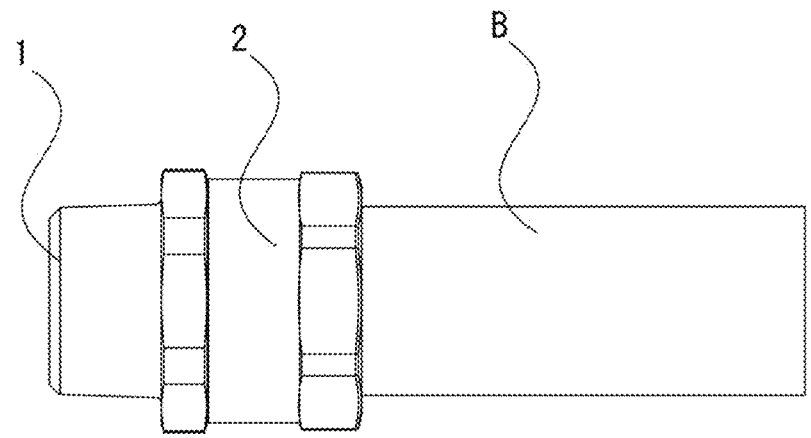
FIG. 8 is a schematic view illustrating a configuration after the hose joint according to the embodiment of the present invention is coupled, in which (a) is a front view, and (b) is a longitudinal cross sectional front view.
Figure 8:
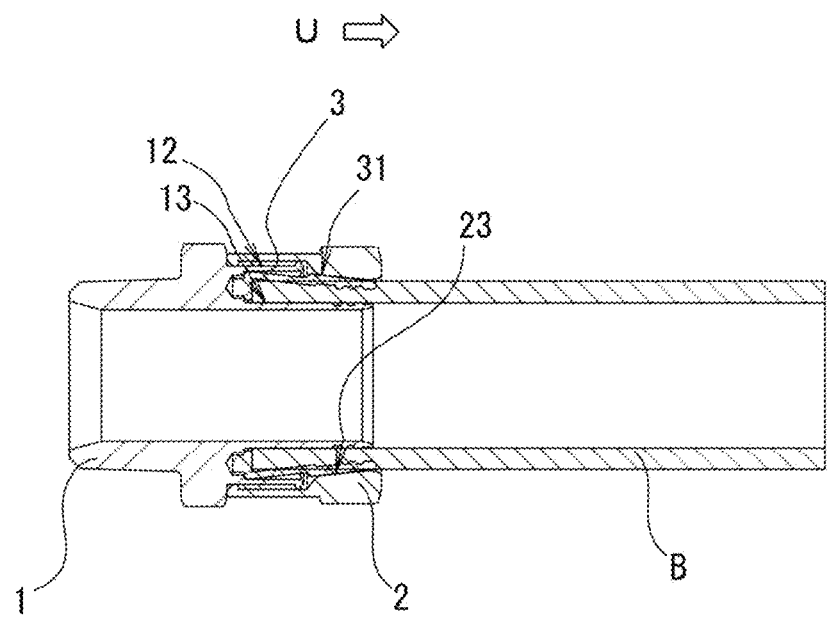

FIG. 7 is a schematic view illustrating a configuration before the hose joint A according to the embodiment of the present invention is coupled, in which (a) is a front view, and (b) is a longitudinal cross sectional front view. FIG. 8 is a schematic view illustrating a configuration after the hose joint A according to the embodiment of the present invention is coupled, in which (a) is a front view, and (b) is a longitudinal cross sectional front view. As illustrated in FIG. 7(b), the cap nut 2 has a cap nut inner inclined surface 23 on the inner peripheral surface, and the cap nut inner inclined surface 23 is formed as the inner diameter of the cap nut 2 gradually becomes smaller toward the hose body B in the axial direction. The diameter expanding/contracting sleeve 3, by contrast, has a sleeve inclined surface 31 facing the cap nut inner inclined surface 23 on the outer peripheral surface.

As illustrated in FIG. 7(b), the hose body B is inserted into the insertion space formed by the guide part 13 and the cylindrical part 12. In the state that the hose body B in abutment with an abutment portion on the inner surface of the diameter expanding/contracting sleeve 3, by tightening the cap nut 2, the hose body B moves toward the hose insertion direction N, as indicated in FIGS. 7(b) and 8(b), and the cap nut inner inclined surface 23 and the sleeve inclined surface 31 are relatively brought close to, thereby causing the entire diameter expanding/contracting sleeve 3 to do contraction deformation gradually.

As a result, the inner peripheral surface of the diameter expanding/contracting sleeve 3 comes into tight contact with the outer surface of the hose body B, thereby compressing and deforming a part of the outer surface of the hose body B. With the inner peripheral surface of the diameter expanding/contracting sleeve 3 biting into the outer surface of the hose body B, the entire hose body B is held immovably in the hose disengagement direction U. Therefore, it is possible to ensure a high resistance against the disengagement of the hose body B.

OTHER EMBODIMENTS

The hose joint A according to the embodiment of the present invention has been explained above as width-across-flats parts of the nipple body 1 and the cap nut 2 are hexagonal width-across-flats parts, but any other width-across-flats parts in a regular polygonal shapes, e.g., a square or octagonal shape may be used, as long as the width-across-flats part can ensure an appropriate distance between two faces on which a tool such as a wrench can be brought into abutment, or may be formed by broaching in two sides.

REFERENCE SIGNS LIST

1 Nipple body
11 Nipple body width-across-flats part
12 Cylindrical part
13 Guide part
14 Connection part
15 Uneven part
2 Cap nut
21 Cylindrical barrel part
22 Nut part
23 Cap nut inner inclined surface
3 Diameter expanding/contracting sleeve
31 Sleeve inclined surface
MD Crescent-shaped step
B Hose body
N Hose body insertion direction (hose insertion direction)
U Direction opposite to hose body insertion direction (hose disengagement direction)
5 Nipple body
51 Nipple body width-across-flats part
53 Guide part
54 Connection part
6 Cap nut
61 Cylindrical barrel part
62 Nut part
D Step

The invention claimed is:

1. A hose joint comprising a nipple body and a cap nut, wherein
the cap nut has a cylindrical barrel part and a nut part,
the nut part has a width-across-flats part, and
a circumscribed circle of an outer periphery of the width-across-flats part has a diameter larger than a diameter of the cylindrical barrel part, and an inscribed circle of the outer periphery of the width-across-flats part has a diameter smaller than the diameter of the cylindrical barrel part.

2. The hose joint according to claim 1, wherein
the nipple body has a nipple body width-across-flats part, and
a width of the nipple body width-across-flats part is equal to or larger than the diameter of the cylindrical barrel part of the cap nut.

3. The hose joint according to claim 2, wherein the nipple body width-across-flats part is shaped in a regular polygon.

4. The hose joint according to claim 1, wherein the width-across-flats part is shaped in a regular polygon.

5. The hose joint according to claim 4, wherein the regular polygon width-across-flats part has a chamfered shape.

* * * * *